March 24, 1959    J. A. WIEDMANN    2,878,830
FLUID CONTROL

Filed Feb. 27, 1956    2 Sheets-Sheet 1

INVENTOR.
JOHN A. WIEDMANN
BY
Norman S. Blodgett

March 24, 1959     J. A. WIEDMANN     2,878,830
FLUID CONTROL

Filed Feb. 27, 1956     2 Sheets-Sheet 2

INVENTOR.
JOHN A. WIEDMANN
BY Norman S. Blodgett

United States Patent Office 2,878,830
Patented Mar. 24, 1959

2,878,830

FLUID CONTROL

John A. Wiedmann, Decatur, Ill., assignor to A. W. Cash Company, Decatur, Ill., a corporation of Illinois Application February 27, 1956, Serial No. 567,967

2 Claims. (Cl. 137—599)

This invention relates to fluid control and more particularly to apparatus for use in a fluid system such as a domestic heating arrangement.

It is usual practice in a domestic heating system, particularly of the type making use of forced hot water, to provide for the introduction of water into the system through a pressure reducing and regulating valve, and, furthermore, to provide at a point in the system a relief valve. Also, in a properly designed hot water heating system it is necessary to provide some means for permitting water to flow into the system without the necessity of its passing through the pressure reducing and regulating valve. Connecting all these valves and the by-pass into the system requires a somewhat awkward and complicated piping system which adds considerably to the expense of the installation. This and other deficiencies of the prior art have been obviated by the present invention in a novel manner.

It is therefore an outstanding object of the present invention to provide a fluid control combining in one body a pressure reducing and regulating valve, a relief valve, and a by-pass valve.

It is another object of this invention to provide a fluid control which gives the functions of pressure reducing and regulating, of pressure relief, and of by-pass facilities without the necessity of complicated piping and the like in a fluid heating system.

Another object of this invention is the provision of a combination valve which is simple to manufacture, easy to install, inexpensive in construction, which requires a minimum of maintenance, and in which the wearing elements are readily replaced.

With these and other objects in view, as will be apparent to those skilled in the art, the invention resides in the combination of parts set forth in the specification and covered by the claims appended hereto.

Figure 1:
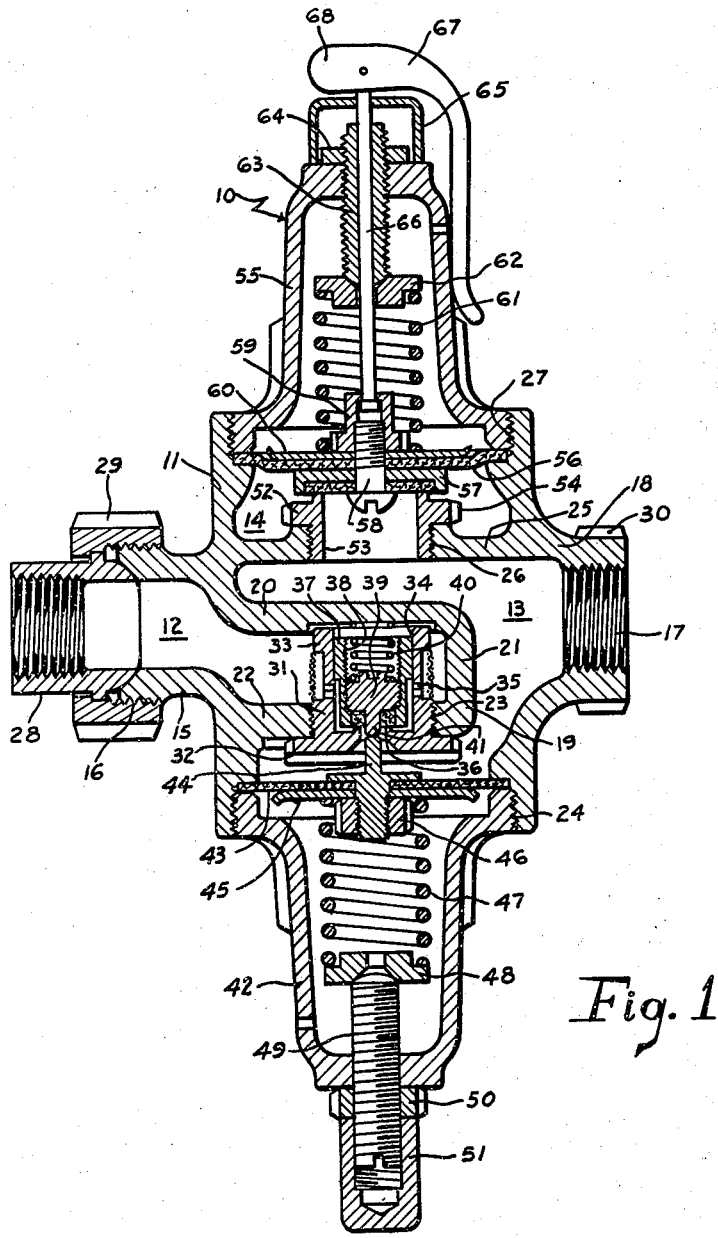
Figure 2:
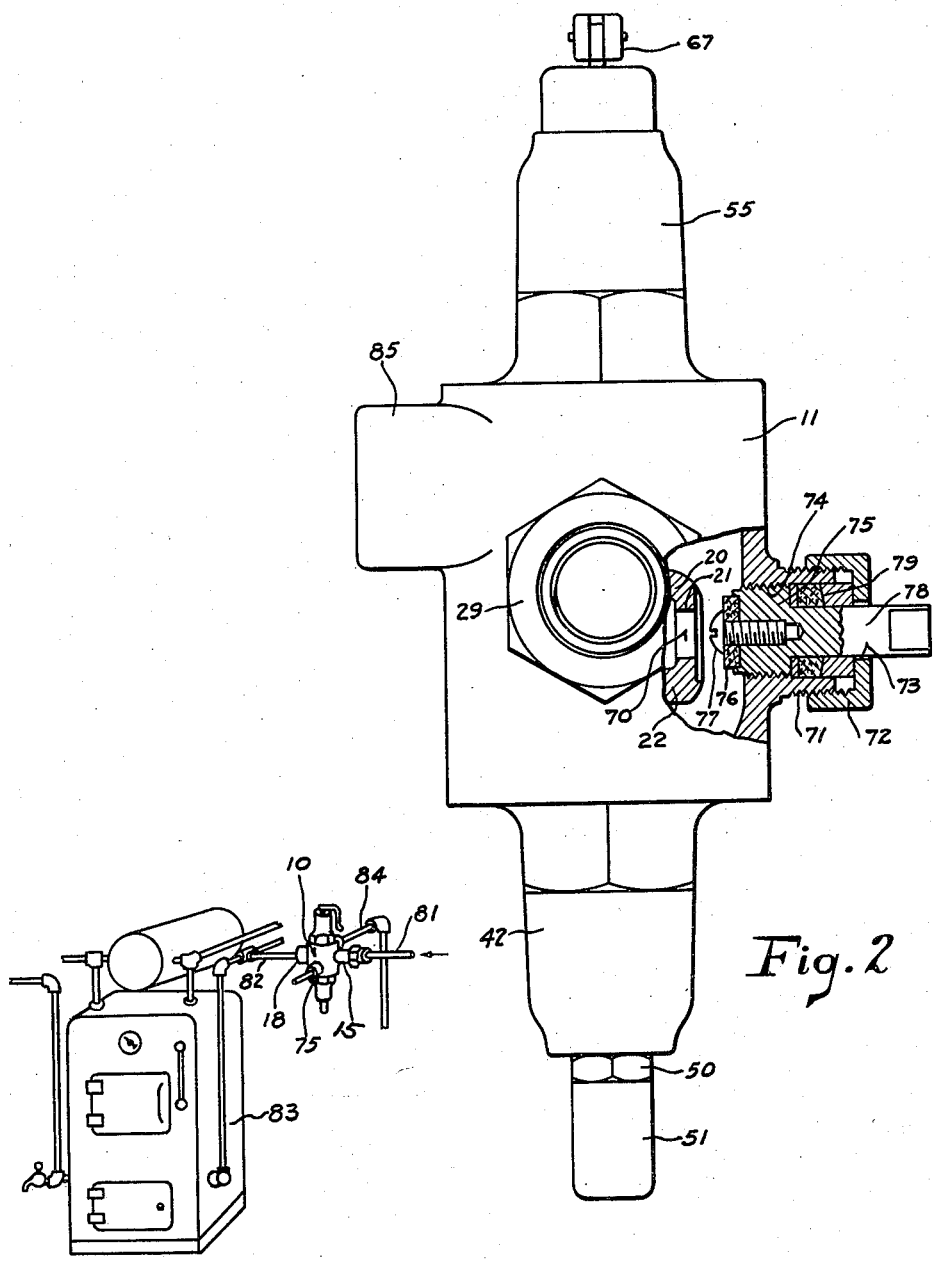
Figure 3:
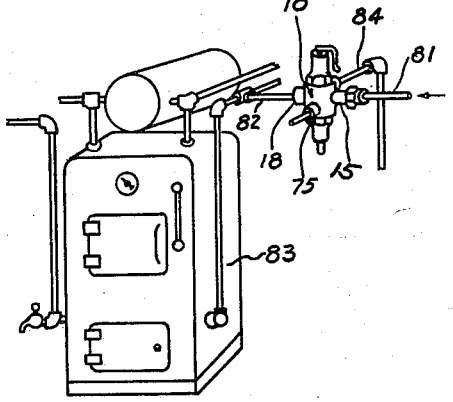

The character of the invention, however, may be best understood by reference to certain of its structural forms as illustrated by the accompanying drawings in which:

Figure 1 is a vertical sectional view of a valve embodying the principles of the present invention, Figure 2 is an elevational view of the invention with a portion sectioned, and Figure 3 is a perspective view of a portion of a heating system showing the value of the invention in place.

For the purposes of the specification which follows, the expression "longitudinal" shall be used to indicate the general direction in which the water flows as it passes from the inlet to the outlet of the valve, while the expression "transverse" shall be used to indicate a direction at right angles thereto.

Referring first to Figure 1, wherein is best shown the general features of the invention, the fluid control of the invention, indicated generally by the reference numeral 10, is shown as having a main body 11 in which are formed an inlet chamber 12, an outlet chamber 13, and a relief chamber 14. The chamber 12 resides in part in an inlet neck 15 extending longitudinally of the valve and having a threaded portion 16 formed on the exterior thereof. The chamber 13 terminates in a threaded outlet passage 17 formed in an outlet neck 18. Generally speaking, the threaded portion 16 of the neck 15 and the threaded outlet 17 of the neck 18 are in longitudinally aligned relationship. The chamber 12 and the chamber 13 are separated by an integral wall 19 having a horizontal portion 20 joined by a vertical portion 21 to a lower horizontal portion 22. A large threaded aperture 23 extends through the wall 22 between the chambers 12 and 13. The body 11 of the fluid control is provided with a large threaded aperture 24 extending from the exterior into the chamber 13 and aligned axially with the threaded bore 23 in the wall 22. The chambers 13 and 14 are separated by a wall 25 having a threaded aperture 26 formed therein and extending between the two chambers. Directly above the bore 26 is a threaded bore 27 which extends from the chamber exteriorly of the body 11 and is aligned axially with the threaded bore 26. It can be seen then that the threaded aperture 23, the threaded aperture 24, the threaded bore 26, and the threaded bore 27 are all aligned vertically with one another; that is to say, their axes lie on the same vertical line. The neck 15 of the body 11 is joined to an internally threaded member 28 by a member 29. The member 29 has internal threads which engage the threaded portion 16 of the neck 15 and also has wrench-engaging surfaces on the exterior thereof. The neck 15, the internally-threaded member 28, and the member 29 form a union. The neck 18 of the body 11 is provided with wrench-engaging surfaces 30.

In the threaded aperture 23 is threaded a plug 31 having wrench-engaging surfaces 32. A reduced neck 33 extends upwardly into the chamber 12 and is provided with an internal bore 34. The walls of the reduced portion are provided with apertures 35 giving access between the chamber 12 and the interior of the bore 34 and a suitable screen extends around the apertures. An extension 36 of the bore extends into the chamber 13 and is surrounded at its upper part by a slight lip which extends upwardly therefrom. A piston 37 resides in the bore 34 and is provided with a threaded internal bore 38. A plug 39 is threaded in the bore 38 and a spring 40 extends between its upper portion and the lower surface of the wall 20. In its lower portion the plug 39 is provided with a stem 41 which extends downwardly therefrom and is surrounded by a suitable fibre valve washer.

A lower bonnet 42 is threaded into the threaded aperture 24 and holds a sealing diaphragm 43 in place within the body 11. On the center of the diaphragm is mounted a stem member 44 which is normally in contact with the stem 41 of the plug 39. A large washer 45 underlies and supports the diaphragm 43 and is held in place by a nut 46 threaded on a dependent threaded extension of the stem member 44. A coil spring 47 extends between the washer 45 and a pressure plate 48 mounted on the upper end of an adjusting screw 49 which is is threaded in the lower portion of the bonnet 42 so as to be axial with the threaded apertures and bores aforementioned. A lock nut 50 and a protecting cap 51 are mounted on the adjusting screw 49 on the portion thereof which extends exteriorly of the bonnet 42.

In the threaded bore 26 which extends through the wall 25 is threadedly-mounted a plug 52 having a smooth central bore 53 and an exterior flange 54 having surfaces adapted to be engaged by wrenches for the adjustment thereof. An upper bonnet 55 is threadedly-mounted in the body 11 in the threaded bore 27. Between the lower edge of the bonnet and the body 11 is clamped the circumference of a sealing diaphragm 56 which has mounted on its central portion on the lower side thereof a valve member 57 having a dependent flange enclosing a suitable fibre washer adapted to engage a slight upwardly-extending lip on the plug 52. A cap screw 58 extends through the valve member 57, the washer, and the diaphragm 56 and cooperates with a nut 59 to hold those members as well as a large washer 60 in unitary relationship. Lying within the bonnet 55 and surrounding the nut 59 is a coil spring 61 which at its upper end presses against an adjusting screw 63 which is threaded through the wall of the bonnet at its upper end and is arranged axially of the threaded bores 26 and 27. A lock nut 64 holds the adjusting screw in place and a cap 65 protects its exterior surfaces where it extends out of the bonnet. The adjusting screw 63 is provided with a small central bore and in this bore resides a shaft 66. The upper end of the shaft is pivotally-connected to a handle 67 having an enlarged smooth upper end 68 adapted for camming action against the top of the cap 65. The lower end of the stem 66 is associated with the nut 59 in swivelled relationship so that when the stem 66 is moved vertically, the nut is constrained to go upwardly with it.

In Figure 2 may be seen the appearance of the fluid control as it looks when viewed longitudinally from the sides of the body 11 occupied by the neck 15. In the portion which is broken away to show the interior of the valve in section, it can be observed that the wall 20 and the wall 22 are joined by a portion of the wall 21 which extends longitudinally of the body and through this portion of the wall 21 extends a bore 70. Axially of this bore 70, the body 11 is provided with an externally-threaded neck 71 over which is threaded a cap 72 having an axial bore 73. The neck 71 is also provided with a partially-threaded bore 74, and in this bore is held in threaded engagement a stem 75. A fibre washer 76 is held on the inner end of the stem 75 by a cap screw 77. The stem 75 is provided with a reduced portion 78 which extends through the bore 73 in the cap 72 and is provided at its exterior end with surfaces which are adapted to be engaged by a wrench. A compression seal means 79 of the usual type is provided to prevent leakage of water around the reduced portion of the stem. As is evident in the drawings, the stem 75, the washer 76, and the bore 70 in the wall 21 are axially aligned and extend transversely of the valve body. The body 11 is provided with a neck 85 which is internally bored and threaded to give access to the chamber 14.

In Figure 3 is shown the use of the fluid control 10 in a hot water heating system of the conventional type. A conduit 81 is connected to the municipal water system and to the fluid control at the neck 15. A conduit 82 is fastened to the exit neck 18 and to the boiler 83 of the heating system. A conduit 84 is connected to the chamber 14 of the fluid control through the neck 85 in the body 11 for the removal of excess pressure by the relief valve portion of the control.

The operation of the apparatus of the invention will be readily understood in view of the above description. Water from the municipal system enters the control through the conduit 81 and the neck 15. The threaded portion 16, the internally-threaded member 28, and the member 29 form a union which makes it easier to introduce the valve into the piping system. Water at the municipal pressure, generally much higher than is required in the heating system, resides in the chamber 12. In the initial installation of the valve in the heating system, it is desirable to permit water to flow directly into the system without passing very slowly through the somewhat restricted pressure regulating and reducing passages. For that reason, the stem 75 is rotated until the fibre washer 76 is well removed from the bore 70, this being the condition of the apparatus shown in Figure 2. Water passes readily from the chamber 12 into the chamber 13 through the bore 70 and out through the neck 18 and the threaded bore 17 into the conduit 82 which is connected into the heating system. When the heating system is full of water, the stem 75 is rotated so that the fibre washer 76 is advanced to contact with the wall 21 surrounding the aperture 70 and no water is permitted to go in that direction. When water in the heating system is lost by leakage and the like, the pressure in the chamber 13 which is directly connected with the heating system is reduced. When this happens, the piston 37 is moved upwardly under the action of the coil spring 47. The piston 37 also moves upwardly against the pressure of the coil spring 40. The washer associated with the piston is normally in contact with the lip at the bottom of the bore 34 in the plug member 31, but, when it moves upwardly, the washer is lifted out of contact with the lip. A passage then exists between the chamber 12 and the chamber 13 through the screen and through the apertures 35 around the piston 37; the resulting flow passes through the outlet bore 36 into the chamber 13. Once the proper pressure has been re-established in the chamber 13, the piston 37 will be pressed downwardly again closing off the passage between the chamber 12 and the chamber 13. If on the other hand, the pressure in the heating system and, thus, in the chamber 13 becomes greater than a predetermined amount due to expansion of the water as it is heated, for instance, it is desirable to release some of the water from the system. The pressure in the chamber 13 of course resides in the bore 53 and exerts itself against the washer associated with the valve member 57. The member 57 is balanced by the coil spring 61 and maintained in position with the washer pressed against the lip at the top of the plug 52. When the pressure exceeds a predetermined amount, however, the pressure forces existing are such that the washer 57 moves upwardly against the pressure of the coil spring 61 and the washer is removed slightly from the lip at the top of the plug 52. Water immediately flows into the chamber 14. If the excess pressure in the chamber 13 is great enough, the chamber 14 is quickly filled so that pressure is also exerted against the diaphragm 56, and so that the effect of raising the washer from the plug 52 is accentuated. This provides for the situation where the increase in pressure in the chamber 13 takes place in a very short period of time and what might be called an emergeny exists. The water relieved by this action passes through the neck 85 and the conduit 84 for disposal. It can be seen, then, that the fluid control of this invention provides a pressure reducing and regulating function, a pressure-relief function, and at the same time provides means for quickly filling the heating system with water when such is necessary. The handle 67 and the stem 66 for manually raising the washer 57 from the stem 52 provides for manual drainage and relief pressure removal when such is desirable. It is also used for cleaning the valve seat and assuring that the action will take place in an emergency.

It should be noted that the section which contains the pressure and regulating function is constructed so that the piston cylinder, strainer, and all are combined in one unit and removable from the control without removing the complete control from the pipe line. It is evident that all of the valve elements are easily removed for replacement when necessary. It is of interest to observe that the by-pass function takes place without disturbing the settings of the relief and the regulating valve portions.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A fluid control comprising a body having a fluid inlet in one side and a fluid outlet in the opposite side in axial alignment with said inlet, the upper and lower ends of said body being open and having axially aligned, internally threaded bores formed therein, a pair of diaphragms disposed one each against a shoulder formed at the inner end of each of said threaded bores for closing the upper and lower ends of said body, a pair of generally tapered, hollow, externally threaded bonnets engageable one each with one of said internally threaded bores for anchoring said diaphragms in the open ends of said body, said bonnets being axially aligned and extending in opposite directions from said body, integral, internal wall means in said body defining a first inner fluid chamber in communication with said fluid inlet and a second fluid chamber generally surrounding said inner fluid chamber and in communication with said fluid outlet, said lower diaphragm forming the lower end of said outlet chamber, said first inlet chamber being defined by a pair of horizontal, vertically spaced wall portions and at least two vertical wall portions disposed normally to each other and spaced from the inner surface of said body, a threaded bore formed in the lower of said horizontal wall portions in axial alignment with said lower diaphragm, a pressure-reducing and regulating valve threadably mounted in said bore and including fluid passage means between said inlet chamber and said outlet chamber and a concentric valve plug therein spring urged in a direction to close said fluid passage means, a valve operating stem mounted in the center of said lower diaphragm, spring means disposed in said lower bonnet for urging said valve operating stem into engagement with said valve plug in said pressure-reducing and regulating valve to open said fluid passage means between said inlet and outlet chambers, said spring means being adjustable to shift said valve operating stem and open said fluid passage means when the outlet chamber pressure reaches a predetermined low value, a manually operable valve mounted in said body and including a valve member passing through a portion of said outlet chamber and normally closing a bore formed in one of said vertical, inner wall portions, said bore being adapted to be opened by said manual valve to permit a rapid transfer of fluid from said inlet chamber to said outlet chamber, a separate, integral inner wall portion extending horizontally above the upper of said vertically spaced wall portions to define with said upper diaphragm a relief chamber which is in communication with a relief outlet formed in said body, said separate horizontal wall portion forming the upper end of said outlet chamber, a relief port formed in said separate horizontal wall portion in axial alignment with said upper diaphragm and including a removable, cylindrical plug having a lip portion extending toward said upper diaphragm, a sealing washer substantially smaller in diameter than said upper diaphragm centered on and secured to the lower surface of said upper diaphragm, spring means disposed in said upper bonnet for urging said upper diaphragm in a downward direction so that said sealing washer engages said lip portion and normally closes said relief port, said spring means being adjusted to permit a predetermined high pressure in said outlet chamber to initially raise said washer off of said lip portion sufficiently to expose the substantially larger area of said upper diaphragm to said outlet pressure whereupon said relief port is rapidly and fully opened to permit the high pressure fluid to exhaust from said outlet chamber, and a shaft extending vertically through said upper bonnet and having its lower end operably connected to said upper diaphragm and its upper, projecting end connected to a handle disposed externally of said upper bonnet and manually operable to open said relief port to exhaust said outlet chamber.

2. A fluid control comprising a casing having a fluid inlet and a fluid outlet formed therein, the upper and lower ends of said casing having axially aligned openings formed therein, a pair of diaphragms each positioned to close one of said openings, a pair of bonnets fitted one each over one of said diaphragms for anchoring said diaphragms in said openings, said bonnets extending in opposite directions from said casing in axial alignment, means within said casing defining a first inner fluid chamber in communication with said fluid inlet and a second fluid chamber generally surrounding said inner fluid chamber and in communication with said fluid outlet, said lower diaphragm forming the lower end of said outlet chamber, said means comprising a pair of horizontal, vertically spaced walls and at least two vertical walls disposed normally to each other and spaced from the inner surface of said casing, a pressure-reducing and regulating valve removably mounted in an aperture in the lower of said vertically spaced walls in axial alignment with said lower diaphragm and adapted to be actuated thereby when the outlet chamber pressure reaches a predetermined low value to open a fluid passage between said inlet chamber and said outlet chamber, a separate inner wall extending horizontally above the upper of said vertically spaced walls to define with said upper diaphragm a relief chamber which is in communication with a relief outlet formed in said casing, said separate horizontal wall forming the upper end of said outlet chamber, a relief port formed in said separate horizontal wall in axial alignment with said upper diaphragm, a sealing washer substantially smaller in diameter than said upper diaphragm centered on and secured to the lower surface of said upper diaphragm, spring means disposed in said upper bonnet for urging said upper diaphragm in a downward direction so that said sealing washer normally closes said relief port, said spring means being adjusted to permit a predetermined pressure in said outlet chamber to initially force said washer away from said relief port sufficiently to expose the substantially larger area of said upper diaphragm to said outlet pressure whereupon said relief port is rapidly and fully opened to permit the high pressure fluid to exhaust from said outlet chamber, and a rod member extending vertically through said upper bonnet and having its lower end operably connected to said upper diaphragm and its upper, projecting end connected to a lever disposed externally of said upper bonnet and manually operable to open said relief port to exhaust said outlet chamber.

References Cited in the file of this patent

UNITED STATES PATENTS

| | | |
|---|---|---|
| 417,135 | Bell | Dec. 10, 1889 |
| 1,697,865 | Hahn | Jan. 8, 1929 |
| 1,858,084 | Heidbrink | May 10, 1932 |
| 1,861,506 | Nelson | June 7, 1932 |
| 2,272,318 | Dennis | Feb. 10, 1942 |